J. PAYTON.
SWATH DIVIDER.
APPLICATION FILED MAR. 30, 1915.
1,244,074.
Patented Oct. 23, 1917.
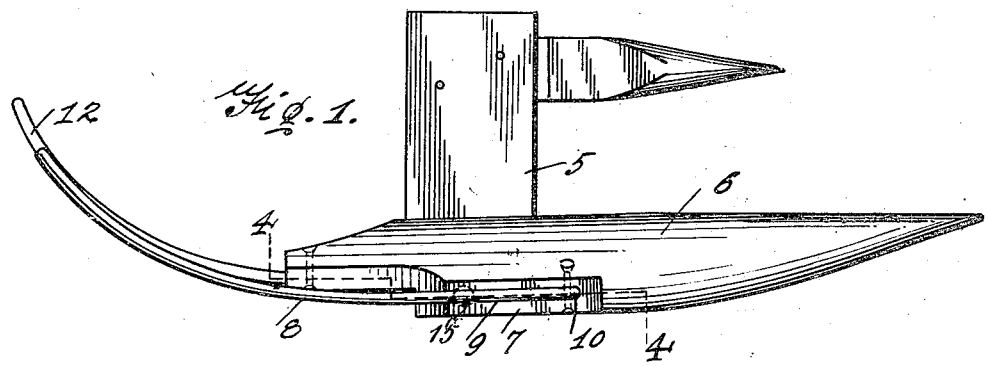
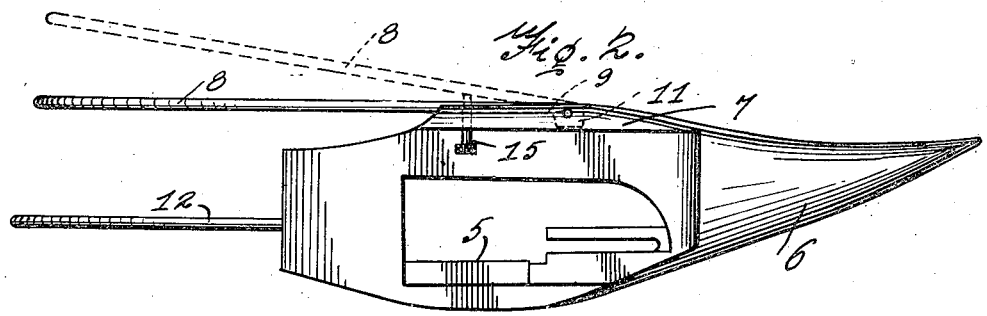
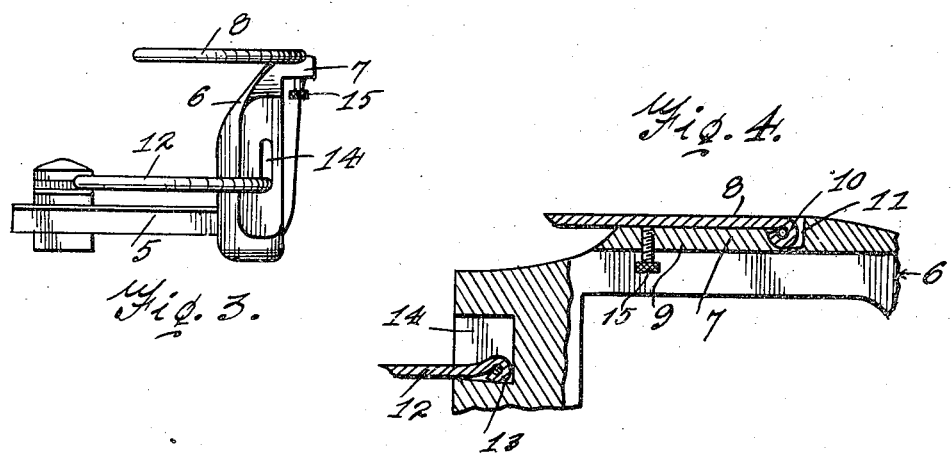

UNITED STATES PATENT OFFICE.

JAMES PAYTON, OF FOXTON, WYOMING.

SWATH-DIVIDER.

1,244,074. Specification of Letters Patent. Patented Oct. 23, 1917.

Application filed March 30, 1915. Serial No. 18,143.

*To all whom it may concern:*

Be it known that I, JAMES PAYTON, a citizen of the United States, residing at Foxton, in the county of Platte, State of Wyoming, have invented certain new and useful Improvements in Swath-Dividers; and I do hereby declare the following to be a full, clear, and exact description of the invention, such as will enable others skilled in the art to which it appertains to make and use the same.

This invention relates to new and useful improvements in dividers for use on mowing and reaping machines to divide the swath of cut grass from the standing grass, and to move it therefrom.

It is a common disadvantage found in mowers of conventional structure that the grass board which is intended to divide the grass is rigidly secured to the end of the finger bar, and it is thus liable to breakage, and by its arrangement the grass has a tendency to clog with relation thereto. It is therefore the object of the present invention to provide such a dividing means which is mounted in such manner as to avoid breakage and which is further adapted to operate in such manner that the grass will not clog with relation thereto.

It is also the object to provide such a dividing means which may be attached to a conventional mower structure in place of the usual grass board with but slight modifications thereof.

With the above and other objects and advantages in view, the invention resides more particularly in the novel combination, formation and arrangement of parts more fully hereinafter described and pointed out in the appended claims.

Reference is had to the accompanying drawings, wherein similar characters of reference designate corresponding parts throughout the several views, and in which:

Figure 1 is a top plan view of the divider attachment associated with a mower structure.

Fig. 2 is a side view of what is shown in Fig. 1 with one of the divider members shown in an adjusted position in dotted lines.

Fig. 3 is a rear view of the structure shown.

Fig. 4 is a sectional view on the line 4—4 of Fig. 1 showing the attaching means of the divider elements.

Referring now more particularly to the accompanying drawings, 5 designates the outer end portion of the finger bar of a mowing machine, and 6 the usual shoe associated therewith, the outer face of the shoe being cut away to receive the usual grass board which the present device supplants, this cutaway portion forming the shoulder or rib 7 at the top of the shoe.

The improved divider means comprises an upper member 8 formed of resilient material having its rear end curved inwardly of the shoe, and having its forward end seated in a groove 9 in the top of the rib 7 and terminating in a head portion 10 pivoted in a depression 11 in the forward end of the groove; and a lower member 12 similarly formed of resilient material having its rear end curved inwardly and having its forward end provided with an eye 13 pivoted in a slot 14 in the rear end of the shoe, the bottom of this slot being substantially horizontal to hold the dividing member in a horizontal plane. It is noted that the lower member is disposed inwardly of the upper member, and is adapted to receive grass therefrom, and dispose it farther inwardly.

The dividing members being pivotally mounted are free to swing upwardly to prevent their breaking upon striking an obstacle. This pivotal mounting together with the resiliency of the members conduces to a further advantage in that as the mowing machine advances, the jarring incident to such movement will impart a vertical vibratory movement to the members in such manner as to materially assist in their operation, and to prevent a tendency of the grass to clog.

To adapt the device for use under abnormal conditions, as when a high wind is blowing, means are provided for holding the dividing member 8 in a raised position which comprises a set screw 15 threadedly engaged in the rib 7 and adapted to extend into the groove 9.

Thus it is seen that an extremely simple and highly efficient means has been provided for the purpose set forth and that the securing means for the grass board which it supplants is used in connection therewith so that the attachment may be most readily associated with existing types of mowers.

The vibratory movement of the dividing members also serves to prevent the grass from clogging in bunches thus enabling the hay to dry or cure properly.

What is claimed is:

1. In a harvester, the combination with a finger bar and a shoe, of upper and lower divider rods pivotally carried by the shoe and freely movable upwardly with respect to the finger bar under the influence imparted to it by the machine in operation, means for limiting vertical movement of the lower divider rod in both directions, and means for adjustably limiting downward movement of the upper divider rod.

2. In a harvester, the combination with the finger bar and a shoe, of a divider rod loosely pivoted to the shoe for swinging movement in an upward direction therefrom, under the influence imparted by movement of the machine, said rod being normally held by gravity at its limit of downward movement, and a stop adjustably carried by the shoe for limiting downward movement of the rod.

3. In a harvester, the combination with a finger bar and a shoe, of a normally depressed divider rod pivoted at one end to the shoe and freely movable upwardly with respect to the finger bar, and means adjustably carried by the shoe for limiting downward movement of said divider rod.

In testimony whereof, I affix my signature, in the presence of two witnesses.

JAMES PAYTON.

Witnesses:
WILLIAM HALL,
C. F. DE FAUNOY.

Copies of this patent may be obtained for five cents each, by addressing the "Commissioner of Patents, Washington, D. C."